Patented Nov. 5, 1940

2,220,156

UNITED STATES PATENT OFFICE 2,220,156

CONDENSATION PROCESS AND PRODUCT

Ralph Albert Jacobson, Landenberg, Pa., assignor to E. I. du Pont de Nemours & Company, Wilmington, Del., a corporation of Delaware No Drawing. Application April 21, 1939, Serial No. 269,167

11 Claims. (Cl. 260—125)

This invention relates to chemical condensation processes and to products derived therefrom, and more particularly to processes in which formaldehyde, ammonium salts and soluble sulfides are condensed in aqueous solutions of acid reaction to give reaction products from which, upon extraction with and crystallization from ethylene chloride, a compound having the molecular formula $C_5H_{10}N_2S_2$ and a melting point of about 183° C. is obtained.

It is known in the art that a condensation product having the molecular formula $C_5H_{10}N_2S_2$ can be obtained by the reaction of formaldehyde and ammonium sulfides in aqueous solution. Thus, M. Delepine, Annales de Chimie et de Physique (7) 570 (1898), reacted aqueous formaldehyde with ammonium hydrogen sulfide and obtained a product melting at 198° C. which he designated as penta-methylene-diamine-disulfide, and as having the following structure:

(I) 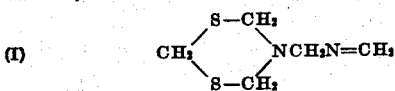

Le Fèvre and Le Fèvre, J. Chem. Soc. 1142 (1932), also reported a condensation product of aqueous formaldehyde and ammonium sulfide having a melting point of 200° C. and a molecular formula of $C_5H_{10}N_2S_2$. They suggested the following structure:

(II) 

Still another possible structure corresponding to the molecular formula $C_5H_{10}N_2S_2$ is as follows:

(III) 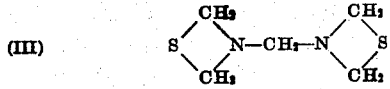

Recent patents, Ter Horst 2,050,204 August 4, 1936, and Teppema 2,084,011, June 15, 1937, disclose the same reactions and describe the product, pentamethylene-diaminodisulfide, as "a white gummy mass which gradually resinifies." These patents adopt Delepine's view as to the structural formula of the condensation product, and Teppema tends to verify this structure by obtaining an addition product with 1-mercaptobenzothiazole.

I have now found that by reacting formaldehyde, an ammonium salt, and a soluble sulfide in aqueous solutions of acid reaction I obtain a product which, though having the same molecular formula $C_5H_{10}N_2S_2$, has properties quite different from those of the products reported in the prior art. Thus, as will be more fully set forth hereinafter, I obtain a product of melting point about 183° C. which is soluble in and may be crystallized from ethylene chloride. In either the crude or recrystallized form, it exhibits markedly superior fungicidal properties as compared with the prior art product.

I react in aqueous solution formaldehyde, an ammonium salt, and a soluble sulfide under conditions such that the reaction is maintained on the acid side thruout its course. Such conditions are suitably obtained by gradually adding an aqueous solution of the soluble sulfide to an aqueous solution of the formaldehyde and the ammonium salt, a suitable acid being added as and if necessary to counteract the alkalizing effect of the sodium sulfide solution and to maintain the reaction solution on the acid side thruout. The following reaction is typical of the condensation and shows why an acidic material is required to maintain the reaction mixture on the acid side:

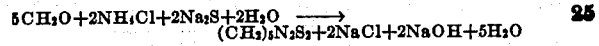

Thus, it will be seen that, if the reaction mixture is to be maintained on the acid side, the two mols of sodium hydroxide liberated must be neutralized. A reaction mixture initially composed of an aqueous solution of formaldehyde and ammonium chloride will be sufficiently acid to counteract at least in part the alkalizing effect of sodium sulfide during the initial steps of the reaction. It is usually safe to add the sulfide solution up to the point where a permanent precipitate begins to form. Thereafter the acidity should be maintained by the addition of a suitable acid. It is desirable to add acid only as required since in too strongly acid solution the reaction product may not precipitate properly. It is also desirable to use a relatively weak acid such as acetic acid and to regulate its addition so that when the sulfide addition is complete the reaction mixture is not too strongly acid.

The following example, in which the parts are by weight, will serve to illustrate the invention:

EXAMPLE

A solution of 1635 parts of 37% aqueous formaldehyde solution and 540 parts of ammonium chloride is placed in a container surrounded by a cooling bath and provided with a stirrer. The resulting mixture is highly acidic. A separate solution of 1200 parts of crystalline sodium sulfide (Na₂S·9H₂O) in 2000 parts of water is prepared. To the formaldehyde-ammonium chloride solution is slowly added one half of the sodium sulfide solution while stirring and maintaining the temperature of the reaction mixture between 5° and 10° C. by means of ice and salt in the cooling bath. The acidity of the mixture is now about pH2. The addition of 398.6 parts of glacial acetic acid is next started, and the addition of the remaining sodium sulfide solution is continued at such a rate that the addition of both is completed simultaneously, at which time the pH is about 4.5. The rates are adjusted so that the temperature of the reaction mixture during the addition remains between 5° and 10° C. The reaction mixture is allowed to stand over night, after which the white product is filtered off and washed with water. Depending upon the amount of washing, from 400 to 455 parts by weight of product is obtained. This unpurified product possesses high fungicidal activity, being effective against Aspergillus niger, Penicillium sp. and other fungi in dilutions of one part of product to 8,000 to 16,000 parts of water.

While the product as obtained above is entirely satisfactory as a fungicide, further purification can be accomplished by crystallization from ethylene chloride. In a typical crystallization experiment on slightly washed but thoroughly dried product, 50 parts of crude product yielded 10 parts (20%) of material insoluble in ethylene chloride and 40 parts (80%) soluble in ethylene chloride. The ethylene chloride solution upon cooling deposited crystals melting at 176–178° C. to the extent of 25 parts (50% of the original amount) and the remaining 15 parts stayed in solution. Upon evaporation of the ethylene chloride, a pale yellow residue was obtained (30% of original). Tests of the fungicidal activity indicated that all three products were equally effective, as shown below.

TABLE I

| Fraction | Effective dilution against Aspergillus niger |
| --- | --- |
| Slightly washed crude product. | 1 part in 8,000–16,000 parts water. |
| Recrystallized product from ethylene chloride. | Do. |
| Residue from ethylene chloride. | Do. |

In another experiment, the crude product was washed thoroughly to constant weight and dried. In this case, 50 parts by weight of product was taken for crystallization and proved to be completely soluble in hot ethylene chloride. Upon cooling, 24 parts (48% of the original weight) of white crystals melting at 176–178° C. was obtained. Upon evaporation of the solution, a pale yellow solid amounting to 26 parts was obtained. Tests of the fungicidal activity again indicated that all three products were equally effective, as shown below.

TABLE II

| Fraction | Effective dilution against Aspergillus niger and Penicillium sp. |
| --- | --- |
| Well-washed crude product. | 1 part in 8,000–16,000 parts water. |
| Recrystallized product from ethylene chloride. | Do. |
| Residue from ethylene chloride. | Do. |

The melting point of the crystallized material, by several subsequent recrystallizations, can be raised to 183° C., where it becomes constant, indicating that a substantially pure compound is obtained. This compound by the following analysis has a molecular formula of $C_5H_{10}N_2S_2$.

TABLE III

Analysis of recrystallized material

| | Found | Calc. for $C_5H_{10}N_2S_2$ |
| --- | --- | --- |
| C | 36.97 | 37.00 |
| H | 6.46 | 6.20 |
| N | 16.63 | 17.30 |
| S | 39.80 | 39.50 |
| Mol. wt | 161 | 162 |

While the above molecular formula is the same as a formula recorded in the prior art, the much lower melting point clearly shows that a different product is obtained. Moreover, the product obtained according to the present invention has a distinctly superior fungicidal activity. With Aspergillus niger the effective dilution of the prior art product is in the order of one part to 2000 parts of water, whereas (see Tables I and II) the fungicidal efficiency of the product of the present invention is in excess of one part in 8000.

In place of ammonium chloride I may use any ammonium salt. It is desirable, however, to use an ammonium salt of a strong acid such as ammonium chloride, bromide, phosphate, or sulfate. Proportions will, of course, be properly adjusted with salts of polybasic acids. Thus, one mol of ammonium sulfate is equivalent to 2 mols of ammonium chloride, and, in Example I, 660 parts of ammonium sulfate is properly substituted for the 540 parts of ammonium chloride.

In place of the pure crystalline sodium sulfide having the formula NA₂S·9H₂O, it is also possible to use the ordinary brown, lumpy, commercial sodium sulfide which has a sodium sulfide content of approximately 60%. It is, of course, necessary to use sufficient commercial sodium sulfide to allow for the extraneous material present and to insure that the actual content of sodium sulfide is adequate. Thus, the sodium sulfide solution of the example may be replaced by a solution made up of 650 parts of 60% commercial sodium sulfide dissolved in 2000 parts of water.

Other soluble sulfides such as potassium, lithium, or any other alkali metal sulfide can also be used, but from a practical viewpoint the cheaper sodium sulfide is, of course, to be preferred.

The glacial acetic acid used in the example can be replaced by acetic acid of lower strength provided the total amount of actual acetic acid is the same. Other carboxylic acids such as formic, propionic, butyric, isobutyric, oxalic, succinic, and citric acids can be used, but acetic acid will normally be chosen because of its low cost and availability. Inorganic acids, such as hydrochloric, sulfuric, or phosphoric, or a mixture of organic and inorganic acids, may also be employed, but the condensation product is soluble in dilute solutions of strong acids and will not precipitate unless the endpoint is carefully adjusted or the excess acid neutralized.

I have found the optimum temperature for the reaction to be in the range of 0 to 15° C., but satisfactory results can be obtained with temperatures as low as about −10° C. and as high as about 50° C. I prefer, however, to operate at the lower temperatures because the product of the reaction then separates as a white crystalline or granular solid which is easily filtered and washed.

The amount of water used for dilution of the reaction mixture is not critical, but the amounts given in the example are very satisfactory. If the sodium sulfide solution is too concentrated, crystals of sodium sulfide may separate and clog the inlet tube to the reaction mixture. Amounts of water greater than those specified can be used, but no particular advantages result therefrom.

The proportion of the reagents may be varied considerably, but it is desirable to have the formaldehyde and the ammonium salt in excess of the sulfide; that is, the amount of formaldehyde and the ammonium salt should be greater than that theoretically required to combine with the sulfide to yield a product having the molecular formula $C_5H_{10}N_2S_2$. While 5 mols of formaldehyde and 2 mols of ammonium chloride are theoretically required for every 2 mols of sodium sulfide, it is desirable to use considerably more formaldehyde, say from 20 to 60 per cent excess, and even a larger excess of the ammonium salt, say around 100 per cent excess. Thus, as illustrated in the example, very good results are obtained with a molal ratio of formaldehyde to ammonium chloride to sodium sulfide of 8:4:2. Similarly, where the ammonium salt is ammonium sulfate, good results are obtained with a molal ratio of formaldehyde to ammonium sulfate to sodium sulfide of 6:2:2. It is to be understood, however, that the invention is not limited to any particular proportions of reactants.

The amount of acid to be added will vary with the amount of the acidic reaction components; that is, the larger the amount of formaldehyde and ammonium chloride the less acid will be required. In view of the fact, as previously pointed out, that, for each mol of sodium sulfide entering into the reaction, there is liberated a mol of sodium hydroxide, it would be expected that 1 mol of acid per mol of sodium sulfide would be required to maintain the initial acidity against the neutralizing effect of each mol of sodium sulfide. However, since the product formed is essentially a basic compound, it is preferable to employ an excess of the acid. Thus, as in the example, it has been found satisfactory to use 1⅓ mols of acetic acid for each mol of sodium sulfide.

The processes described herein furnish a new and economical procedure for preparing cheap, stable condensation products characterized by high fungicidal activity. The products are useful fungicides having an effectiveness in dilutions as high as 1 to 16,000. They may be readily sprayed on plants, trees, and flowers, may be employed as a seed disinfectant, and may be impregnated into materials such as fabrics, fibers, paper, wood, leather, wallboard, and the like to render them resistant to fungi and for other purposes where protection against fungi is desirable. They may also be employed for the purpose of more general pest control involving various kinds of economically harmful lower forms of life, e. g., bacteria, insects of various kinds, worms, bugs, and such pests.

As many apparently widely differing embodiments of my invention may be made, it is to be understood that such variations as come within the spirit of the invention are intended to be included within the scope of the appended claims.

I claim:

1. The process which comprises reacting formaldehyde, an ammonium salt, and a soluble sulfide in an aqueous solution of acid reaction.

2. The process which comprises introducing a soluble sulfide into an aqueous solution of acid reaction containing formaldehyde and an ammonium salt.

3. The process which comprises preparing an acidic aqueous solution of formaldehyde and an ammonium salt, introducing a soluble sulfide into the solution, and adding an acid as required to keep the solution acidic.

4. The process which comprises preparing an aqueous solution of formaldehyde and an ammonium salt of a strong acid, adding an aqueous solution of a soluble sulfide, and introducing acid as required to keep the solution acidic.

5. The process which comprises preparing an aqueous solution of formaldehyde and an ammonium salt of a strong acid, gradually adding an aqueous solution of sodium sulfide, and adding an acid conterminately with at least part of the sulfide addition.

6. The process which comprises preparing an aqueous solution of formaldehyde and ammonium chloride, gradually adding an aqueous solution of sodium sulfide, and adding acetic acid concurrently with the latter part of the sulfide addition, the acid addition being started at a time such and continued at a rate such that the solution has an acid reaction thruout.

7. A compound having the molecular formula $C_5H_{10}N_2S_2$, and a melting point of about 183° C.

8. A composition of matter obtainable by the condensation of formaldehyde, an ammonium salt, and a soluble sulfide in an aqueous solution of acid reaction.

9. A fungicidal and bactericidal composition comprising containing as an essential active ingredient a product of the reaction of formaldehyde, an ammonium salt, and a soluble sulfide in an aqueous solution of acid reaction.

10. A composition of matter obtainable by introducing a soluble sulfide into an acidic aqueous solution of formaldehyde and an ammonium salt and adding an acid as required to keep the solution acidic.

11. A fungicidal and bactericidal composition comprising a product of the reaction of formaldehyde and ammonium salt and a soluble sulfide of the character obtainable by introducing a soluble sulfide into an acidic aqueous solution of formaldehyde and an ammonium salt and adding an acid as required to keep the solution acidic.

RALPH ALBERT JACOBSON.